US011123675B2

(12) United States Patent
Sarna et al.

(10) Patent No.: US 11,123,675 B2
(45) Date of Patent: Sep. 21, 2021

(54) FILTERING MEDIA MEMBER FOR FILTERING PARTICULATE MATTER IN A FLUID STREAM

(71) Applicant: DCL International Inc., Concord (CA)

(72) Inventors: Zbigniew Sarna, Brampton (CA); Haiqing Liu, Richmond Hill (CA); John P. Muter, King (CA); Shazam S. Williams, Toronto (CA)

(73) Assignee: DCL International Inc., Concord (CA)

(*) Notice: Subject to any disclaimer, the term of this patent is extended or adjusted under 35 U.S.C. 154(b) by 287 days.

(21) Appl. No.: 16/070,830

(22) PCT Filed: Feb. 8, 2017

(86) PCT No.: PCT/CA2017/050138
§ 371 (c)(1),
(2) Date: Jul. 18, 2018

(87) PCT Pub. No.: WO2017/136926
PCT Pub. Date: Aug. 17, 2017

(65) Prior Publication Data
US 2019/0022569 A1    Jan. 24, 2019

Related U.S. Application Data

(60) Provisional application No. 62/292,570, filed on Feb. 8, 2016.

(51) Int. Cl.
*B01D 46/52* (2006.01)
*B01D 39/20* (2006.01)
(Continued)

(52) U.S. Cl.
CPC .......... *B01D 46/527* (2013.01); *B01D 39/08* (2013.01); *B01D 39/2041* (2013.01);
(Continued)

(58) Field of Classification Search
CPC ............... B01D 39/10; B01D 39/2041; B01D 39/2044; B01D 46/527; F01N 3/0218
See application file for complete search history.

(56) References Cited

U.S. PATENT DOCUMENTS 2,019,186 A    3/1933 Kaiser
2,720,937 A    3/1952 Root, Jr.
(Continued)

FOREIGN PATENT DOCUMENTS

CA      2712721 C       7/2009
DE   202007003597 U1    7/2008
(Continued)

OTHER PUBLICATIONS

Extended European Search Report dated Jul. 23, 2019 in respect of European Application No. 17749854.0.
(Continued)

*Primary Examiner* — Patrick Orme
(74) *Attorney, Agent, or Firm* — Bereskin & Parr LLP/S.E.N.C.R.L., s.r.l.

(57) ABSTRACT

A filtering media member is formed of porous material. A first edge portion includes an upstream edge. A second edge portion is spaced apart from the first edge portion and includes a downstream edge. A main portion is arranged intermediate the first and second edge portions. The edge portions and the main portion together define a generally planar first surface. A plurality of channels is formed on the first surface. Each of the channels is arranged adjacent to one another and has a length. Each of the channels includes an inlet disposed proximate to the first edge portion so that, in use, fluid flows from the upstream edge through the inlet to the respective channel, and each of the channels has a width
(Continued)

in the lateral direction that decreases across its length so that the channels taper between the first and second edge portions.

18 Claims, 5 Drawing Sheets

(51) Int. Cl.
*F01N 3/022* (2006.01)
*F01N 3/021* (2006.01)
*B01D 39/08* (2006.01)

(52) U.S. Cl.
CPC ......... *F01N 3/0218* (2013.01); *F01N 3/0226* (2013.01); *B01D 2279/30* (2013.01); *F01N 2330/10* (2013.01); *F01N 2330/30* (2013.01); *F01N 2330/324* (2013.01); *F01N 2450/22* (2013.01)

(56) References Cited

U.S. PATENT DOCUMENTS

| | | | |
|---|---|---|---|
| 3,146,197 A | 1/1962 | Getzin | |
| 3,293,833 A | 2/1963 | Barany | |
| 4,234,326 A | 11/1980 | Bailey et al. | |
| 4,348,360 A | 9/1982 | Chang et al. | |
| 4,537,812 A | 8/1985 | Elbers | |
| 4,598,063 A | 7/1986 | Retallick | |
| 4,652,286 A | 3/1987 | Kusuda et al. | |
| 4,849,185 A | 7/1989 | Wittig | |
| 5,169,604 A | 12/1992 | Crothers, Jr. | |
| 5,323,608 A | 6/1994 | Honma | |
| 5,589,076 A | 12/1996 | Womack | |
| 5,656,245 A | 8/1997 | Fujisawa et al. | |
| 5,746,986 A | 5/1998 | Pollock et al. | |
| 5,820,646 A | 10/1998 | Gillingham et al. | |
| 5,820,832 A | 10/1998 | Huttenhofer et al. | |
| 5,853,902 A | 12/1998 | Usui | |
| 5,908,480 A | 6/1999 | Ban et al. | |
| 6,063,165 A | 5/2000 | Dullien et al. | |
| 6,089,347 A | 7/2000 | Flugger | |
| 6,093,237 A | 7/2000 | Keller et al. | |
| 6,190,784 B1 | 2/2001 | Maus et al. | |
| 6,238,561 B1 | 5/2001 | Liu et al. | |
| 6,273,938 B1 | 8/2001 | Fanselow et al. | |
| 6,548,147 B1 | 4/2003 | Raidel et al. | |
| 7,157,060 B1 | 1/2007 | Newburry | |
| 7,281,606 B2 | 10/2007 | Marocco | |
| 7,410,621 B2 | 8/2008 | Muter et al. | |
| 7,412,824 B1 | 8/2008 | Newburry et al. | |
| 7,655,194 B2 | 2/2010 | Muter | |
| 7,919,052 B2 | 4/2011 | Ahmed | |
| 8,062,602 B2 | 11/2011 | Roe et al. | |
| 8,066,950 B2 | 11/2011 | Newburry et al. | |
| 8,435,329 B2 | 5/2013 | Hayward | |
| 8,702,830 B2 | 4/2014 | Muter | |
| 8,932,531 B2 | 1/2015 | Muter et al. | |
| 9,101,905 B2 | 8/2015 | Muter et al. | |
| 2003/0121845 A1 | 7/2003 | Wagner et al. | |
| 2004/0013580 A1 | 1/2004 | Bruck et al. | |
| 2007/0107392 A1* | 5/2007 | Muter | F01N 3/0218 55/497 |
| 2010/0300733 A1 | 12/2010 | Hayward | |
| 2011/0104016 A1* | 5/2011 | Bruck | F01N 3/281 422/177 |
| 2011/0186504 A1* | 8/2011 | Rocklitz | B01D 25/26 210/493.1 |
| 2014/0360891 A1 | 12/2014 | Kline et al. | |

FOREIGN PATENT DOCUMENTS

| | | |
|---|---|---|
| EP | 2244806 B1 | 3/2013 |
| GB | 2131717 A | 6/1984 |
| GB | 2440123 B | 12/2010 |
| WO | 2005066469 A1 | 7/2005 |
| WO | 2009092983 A1 | 7/2009 |
| WO | 2014138996 A1 | 9/2014 |
| WO | 2017136926 A1 | 8/2017 |

OTHER PUBLICATIONS

International Search Report dated May 1, 2017 in respect of PCT/CA2017/050138.
Written Opinion of the International Search Authority dated May 1, 2017 in respect of PCT/CA2017/050138.
International Preliminary Report on Patentability dated Aug. 14, 2018 in respect of PCT/CA2017/050138.

* cited by examiner

FILTERING MEDIA MEMBER FOR FILTERING PARTICULATE MATTER IN A FLUID STREAM

CROSS-REFERENCE TO RELATED APPLICATIONS

This is a national stage application of International Application No. PCT/CA2017/050138 filed on Feb. 8, 2017, which claims priority to U.S. Provisional Application No. 62/292,570 filed on Feb. 8, 2016, and the entire contents of each are hereby incorporated herein by reference.

FIELD

The present disclosure relates generally to filtering apparatuses, and particularly to apparatuses for filtering particulate matter from an engine exhaust gas stream.

BACKGROUND

The following paragraphs are not an admission that anything discussed in them is prior art or part of the knowledge of persons skilled in the art.

U.S. Pat. No. 4,537,812 describes an improved corrugated sheet aluminum spacer for use in pleated media air filters. The spacers are folded in zig zag fashion along one edge in a succession of V formations having a first height and width, and along the opposite edge in a succession of V formations having both heights and widths approximately one-fifth of the first height and width. Since the fold lines are substantially parallel, there are five V formations within a given width of the opposite edge for each one along the first edge, the fold lines of the intermediate V formations extending from the second edge only a portion of the distance to the first edge, but preferably about 90% of the length of the sheet. The V formations are formed by passing the aluminum between a pair of rolls with forming blades having overlapping edges which engage the sheet.

U.S. Pat. No. 6,273,938 describes channel flow filtration media possessing high efficiency and low pressure drop. The media is formed from a plurality of filtration layers at least some of which include a multi-dimensional channel pattern having a plurality of continuous, tortuous channels and a multi-dimensional edge at each end of the plurality of channels formed therein. The filtration medium is configured as a stack with the multi-dimensional edge of the channel pattern forming a plurality of inlets open through a first face of the stack, a plurality of outlets open through a second face of the stack, and a corresponding plurality of disruptive fluid pathways passing from the inlets through the stack to the outlets. The filtration layers may be formed from a non-woven material, such as a carbon loaded multi-layer BMF web capable of adsorption of undesired vapors and odors from a fluid.

U.S. Pat. No. 8,702,830 describes a filtering apparatus having a plurality of passages made up of juxtaposed longitudinally extending channels. The passages are axially divided by a porous filtering media extending across the channels whereby the channels fluidly communicate through the porous filtering media. A pressure differential is created across the filtering media by restricting flow through an end of each channel, with each restriction being at an opposite end from that of the other channel. As flow restriction rather than outright blocking is used, some flow is possible along each passage directly along the channels even if the channels lose the ability to fluidly communicate through clogging of the filtering media.

INTRODUCTION

The following is intended to introduce the reader to the detailed description that follows and not to define or limit the claimed subject matter.

In an aspect of the present disclosure, a filtering media member formed of porous material may include: a first edge portion including an upstream edge that extends in a lateral direction; a second edge portion spaced apart from the first edge portion in a longitudinal direction and including a downstream edge that extends in the lateral direction; a main portion arranged intermediate the first and second edge portions, the edge portions and the main portion together defining a generally planar first surface; and a plurality of channels formed on the first surface, each of the channels arranged adjacent to one another in the lateral direction and having a length that extends in the longitudinal direction between the first and second edge portions.

Each of the channels may include an inlet disposed proximate to the first edge portion so that, in use, fluid flows from the upstream edge through the inlet to the respective channel. Each of the channels may have a width in the lateral direction that decreases across its length so that the channels taper between the first and second edge portions.

Each of the channels may terminate adjacent to the second edge portion so that, in use, fluid flows from the channel through the second edge portion to the downstream edge. A ratio between the length of each of the channels in the longitudinal direction and a pitch of the channels in the lateral direction may be greater than 5:1. Each of the edge portions may have a length dimension in the longitudinal direction that is substantially less than a length dimension of the main portion.

Each of the channels may be recessed relative to the first surface. Each of the channels may have a height dimension that is substantially less than a height dimension of the filtering media member between the first surface and a generally planar second surface.

The filtering media member may be formed of porous metal fiber material. The filtering media member may be formed of an iron-chromium-aluminum (FeCrAl) alloy fiber material.

The filtering media member may at least partially include a brazing material. The brazing material may consist of a combination including a brazing paste mixed with a metal powder or fiber. The metal powder or fiber may consist of an iron-chromium-aluminum (FeCrAl) alloy powder or fiber.

In an aspect of the present disclosure, an apparatus for filtering particulate matter in a fluid stream may include: the filtering media member; and a housing supporting the filtering media member to permit flow of the fluid stream through the filtering media member between the upstream and downstream edges. The apparatus may include a filtering media sheet assembled adjacent to and parallel with the filtering media member. The filtering media member and the filtering media sheet may be arranged in a spiral configuration, with the filtering media sheet sandwiched between adjacent layers of the filtering media member. The filtering media member and the filtering media sheet may be arranged in a stacked configuration, with the filtering media sheet sandwiched between adjacent layers of the filtering media member.

A brazing material may at least partially secure the filtering media member and the filtering media sheet together. The brazing material may consist of a combination including a brazing paste mixed with a metal powder or fiber. The metal powder or fiber may consist of an iron-chromium-aluminum (FeCrAl) alloy powder or fiber.

In an aspect of the present disclosure, a method may include: providing the apparatus; and flowing the fluid stream through the apparatus to entrain the particulate matter in the filtering media member and the filtering media sheet. The step of flowing may include flowing an engine exhaust gas stream. The step of flowing may include flowing a gasoline engine exhaust gas stream.

In an aspect of the present disclosure, a filtering media member formed of porous material may include: an upstream edge that extends in a lateral direction; a downstream edge that is spaced apart from the upstream edge in a longitudinal direction and extends in the lateral direction; and a plurality of alternating first and second duct elements extending in the longitudinal direction between the upstream and downstream edges.

Each of the first duct elements may have a width in the lateral direction that increases across its length between the upstream and downstream edges. Each of the second duct elements may have a width in the lateral direction that decreases across its length so that the second duct elements taper between the upstream and downstream edges.

At the upstream edge, each of the second duct elements may form an inlet between the respective adjacent first duct elements. At the downstream edge, each of the second duct elements may rise towards an outer surface formed by the respective adjacent first duct elements.

Other aspects and features of the teachings disclosed herein will become apparent, to those ordinarily skilled in the art, upon review of the following description of the specific examples of the present disclosure.

BRIEF DESCRIPTION OF THE DRAWINGS

The drawings included herewith are for illustrating various examples of apparatuses and methods of the present disclosure and are not intended to limit the scope of what is taught in any way. In the drawings.

DETAILED DESCRIPTION

Various apparatuses or methods will be described below to provide an example of an embodiment of each claimed invention. No embodiment described below limits any claimed invention and any claimed invention may cover apparatuses and methods that differ from those described below. The claimed inventions are not limited to apparatuses and methods having all of the features of any one apparatus or method described below, or to features common to multiple or all of the apparatuses or methods described below. It is possible that an apparatus or method described below is not an embodiment of any claimed invention. Any invention disclosed in an apparatus or method described below that is not claimed in this document may be the subject matter of another protective instrument, for example, a continuing patent application, and the applicant(s), inventor(s) and/or owner(s) do not intend to abandon, disclaim or dedicate to the public any such invention by its disclosure in this document.

Figure 1:
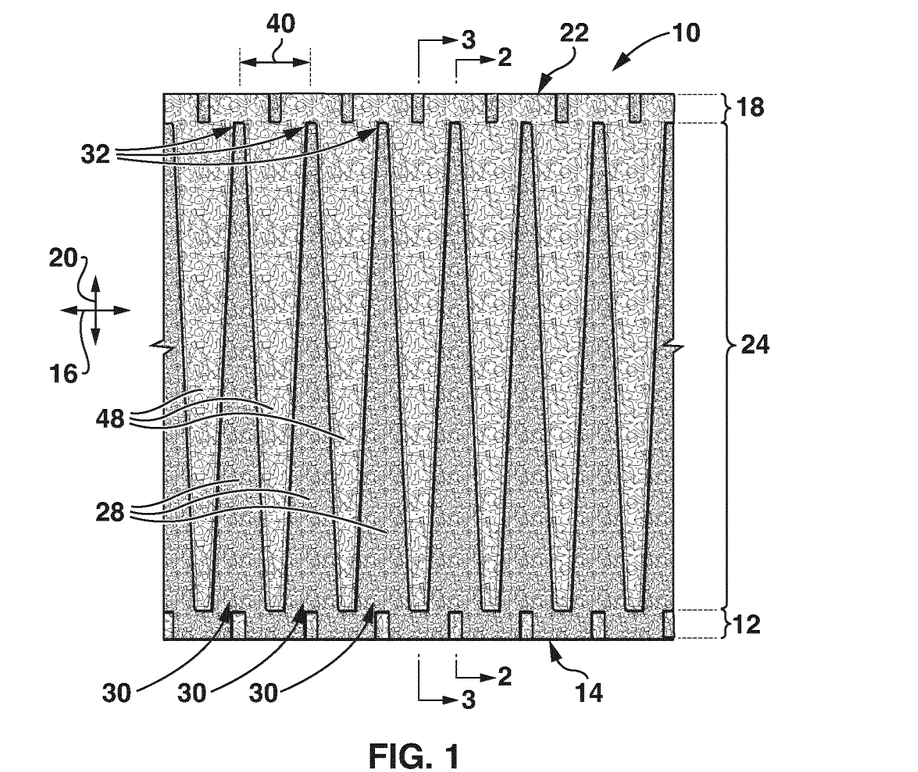
FIG. 1 is a top view of a filtering media member.
Figure 2:
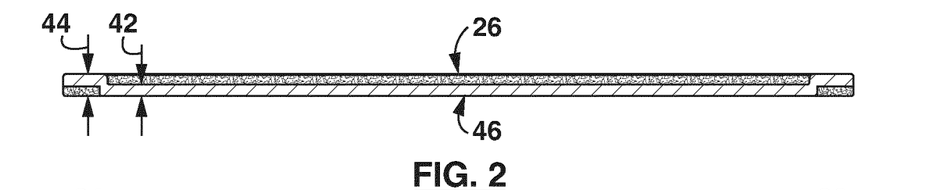
FIGS. 2 and 3 are sectional views along lines 2-2 and 3-3, respectively, in FIG. 1.
Figure 3:
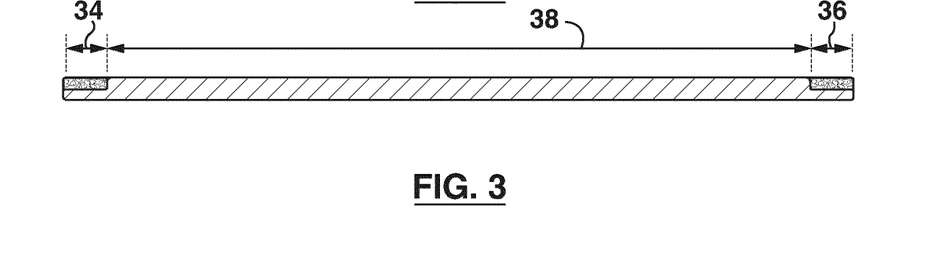

Referring to FIGS. 1, 2 and 3, an example of a filtering media member is shown generally at reference numeral 10. The filtering media member 10 is shown as an integral component formed of porous material.

In the example illustrated, the filtering media member 10 includes a first edge portion 12 having an upstream edge 14 that extends in a lateral direction 16. The filtering media member 10 further includes a second edge portion 18 spaced apart from the first edge portion 12 in a longitudinal direction 20. The second edge portion 18 has a downstream edge 22 that extends in the lateral direction 16. A main portion 24 is arranged intermediate the edge portions 12, 18. The edge portions 12, 18 and the main portion 24 together define a planar first surface 26.

A plurality of channels 28 are formed on the first surface 26. In the example illustrated, each of the channels 28 has an inlet 30 that is disposed proximate to the first edge portion 12 so that fluid may flow from the upstream edge 14 through the inlet 30 to the respective channel 28.

In the example illustrated, each of the channels 28 is arranged adjacent to one another in the lateral direction 16 and has a length that extends in the longitudinal direction 20 between the edge portions 12, 18. Each of the channels 28 is shown to have a width in the lateral direction 16 that decreases across its length so that the channels 28 taper between the edge portions 12, 18 with a generally triangular shape. Each of the channels 28 is shown to terminate at a respective tip 32 adjacent to the second edge portion 18 so that, in use, fluid may flow from the channel 28 through the second edge portion 18 to the downstream edge 22.

In use, a particle-carrying fluid enters the upstream edge 14, passes through the main portion 24 (with a portion passing through the channels 28), and exits the downstream edge 22, and particles are thereby entrained in the filtering media member 10.

The arrangement of the channels 28 may provide for an increase in surface area for particle entrainment by the filtering media member 10, and without gaps that would allow for bypass of fluid entirely through the filtering media member 10. The increase in surface area may delay clogging of the filtering media member 10.

In the example illustrated, each of the edge portions 12, 18 has a length dimension 34, 36, respectively, in the longitudinal direction 20 that is substantially less than a length dimension 38 of the main portion 24. By way of example, and not intended to be limiting, each of the length dimensions 34, 36 may be approximately 5 mm, and the length dimension 38 may be approximately 80 mm.

The channels 28 are spaced apart from one another in the lateral direction 16 according to a pitch 40. By way of example, and not intended to be limiting, the pitch 40 may be approximately 12 mm. Accordingly, a ratio between the length of each of the channels 28 in the longitudinal direction 20 (i.e. the length dimension 38 in the example illustrated) and the pitch 40 of the channels 28 in the lateral direction 16 may be greater than 5:1.

Each of the channels 28 is recessed relative to the first surface 26, thereby forming an alternating or corrugated pattern relative to sections 48. In the example illustrated, each of the channels 28 has a height dimension 42 that is substantially less than a height dimension 44 of the filtering media member 10 between the first surface 26 and a planar second surface 46. By way of example, and not intended to be limiting, the height dimension 44 may be approximately 0.5 mm, and the height dimension 42 may be approximately 50% of the height dimension 44.

In some examples, the filtering media member 10 may be formed of porous metal fiber material. In some examples, the filtering media member 10 may be formed of an iron-chromium-aluminum (FeCrAl) alloy fiber material. By way of example, and not intended to be limiting, the material may be Bekipor ST™ metal fiber filtration material (N.V. Bekaert S.A., Zwevegem, Belgium), having the following product specifications:

| Thickness (mm) | Weight (g/m$^2$) | Porosity (%) | Air Permeability * (l/d$^2$ min @ 200 Pa) | H/k (1/m) |
|---|---|---|---|---|
| 0.30 | 450 | 80 | 1500 | 4.36E+06 |

* Determined according NF 95-352 equivalent ISO 4022

The filtering media member 10 may be manufactured by roll forming, in which a length of starting sheet material is passed through at least one roller die. Accordingly, in some examples, the filtering media member may have a generally continuous cross sectional thickness, so that opposing sides of the filtering media member may have a generally inverse or mirror image structure.

Figure 4:
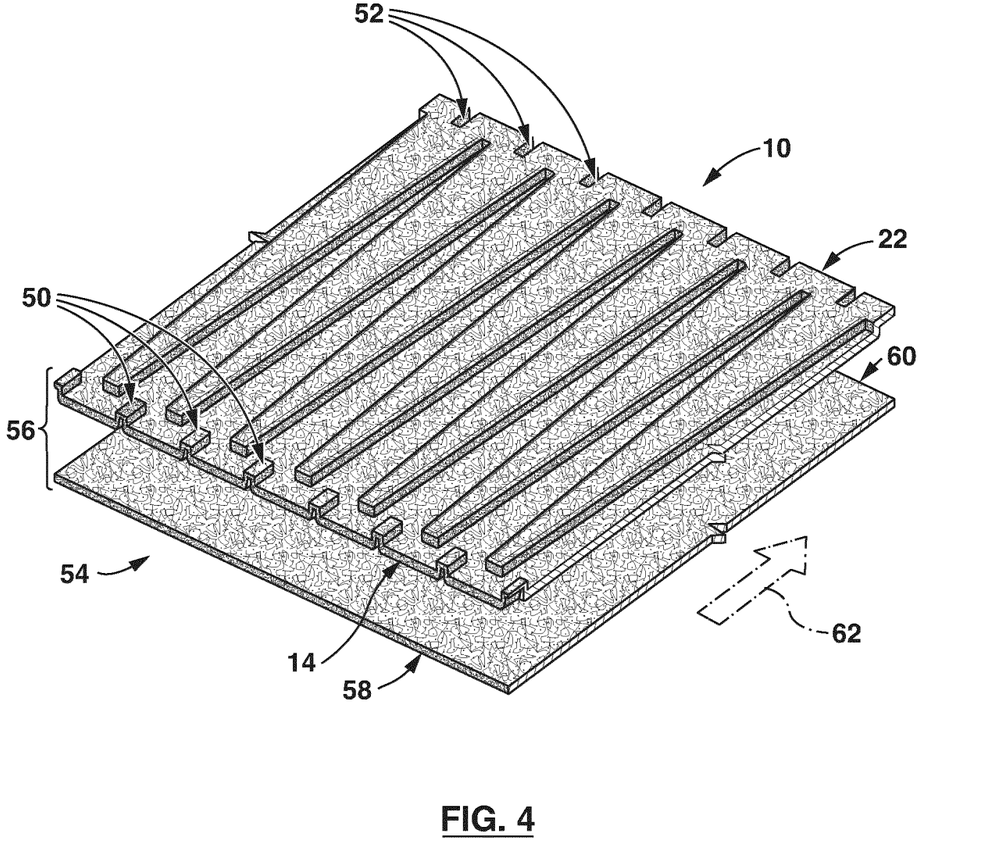
FIG. 4 is a perspective view of the filtering media member and a filtering media sheet.

Referring to FIG. 4, the filtering media member 10 may include a plurality of protrusions 50 spaced apart along the upstream edge 14, and correspondingly a plurality of recesses 52 spaced apart along the downstream edge 22. The protrusions 50 and the recesses 52 may provide for the take-up of material during roll forming.

In the example illustrated, the filtering media member 10 is shown adjacent to and parallel with a filtering media sheet 54 to form a combination 56. The filtering media sheet 54 may be a planar, flat element and includes upstream and downstream edges 58, 60 that coincide with the upstream and downstream edges 14, 22 of the filtering media member 10 relative to a fluid flow direction 62. The filtering media sheet 54 may have a height dimension that is approximately 0.5 mm.

Figure 5:
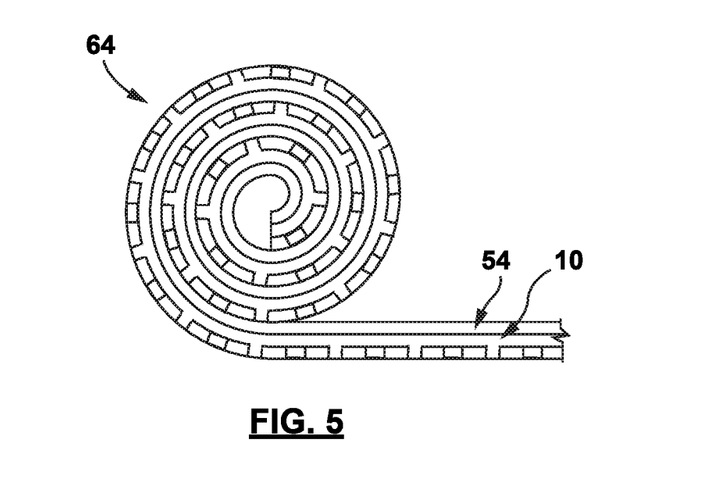
FIG. 5 is a side schematic view of the filtering media member and the filtering media sheet being wound in a spiral configuration.

Referring to FIG. 5, in some examples, the filtering media member 10 and the filtering media sheet 54 may be assembled by winding the combination into a spiral configuration 64, with the filtering media sheet 54 sandwiched between adjacent layers of the filtering media member 10. In other examples, a stacked configuration is possible.

In the example illustrated, the filtering media member 10 and the filtering media sheet 54 should be wound tightly to avoid gaps between them. In some examples, a brazing powder and/or foil may be used to ensure a solid connection between the filtering media member 10 and the filtering media sheet 54.

Furthermore, brazing materials may be used with the filtering media member 10 and the filtering media sheet 54 to increase adhesion and/or reduce gas leakage, and thus increase the filtering efficiency. In some examples, a brazing material may be implemented towards the edges 14, 58 and 22, 60 to achieve a closed end structure that promotes fluid flow to enter the inlets 30 and exit the outlets at the downstream side. The brazing material may be brushed on or otherwise applied to the outward faces of the filtering media member 10 and the filtering media sheet 54 when assembled as shown in FIG. 5, and then subjected to heat treatment at a suitable brazing temperature. In other examples, a brazing material may be used to achieve a closed end structure with the filtering media member 10 without the filtering media sheet 54, which may be omitted entirely.

Suitable materials may include a gel binder for making brazing filler metal pastes (e.g., S' Binders™, Wall Colmonoy Corporation, Madison Heights, Mich., United States), and a high temperature Nickel-based brazing filler metal powder (e.g., Nicrobraze® 30, Wall Colmonoy Corporation, Madison Heights, Mich., United States). However, a brazing paste implemented on its own may not be effective because it may absorb into porous structures of the filtering media member 10 and the filtering media sheet 54. In some examples, a combination including a brazing paste mixed with a metal (e.g., FeCrAl alloy powder or fiber) may be used. In such examples, the thermal expansion coefficient of the metal brazing paste may be similar to that of the filtering media member 10 and the filtering media sheet 54 so that there is good adhesion and durability. In other examples, it may be possible to use a combination including a brazing paste mixed with a ceramic (e.g., a silica-alumina powder or fiber), although these materials may tend to separate from the filtering media member 10 and the filtering media sheet 54.

Figure 6:
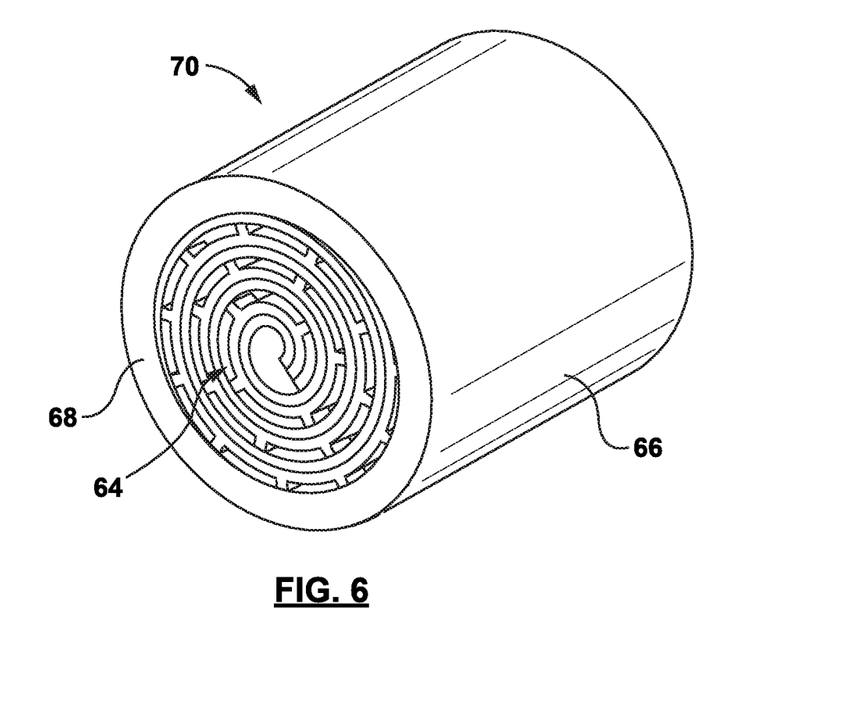
FIG. 6 is a perspective schematic view of an apparatus including the filtering media member and the filtering media sheet.

Referring to FIG. 6, the spiral configuration 64 is shown assembled and housed in a cylindrical exterior mantle 66. By way of example, and not intended to be limiting, the mantle 66 may have a diameter of approximately 6". The mantle 66 may be formed of stainless steel sheet metal, and may include a flange edge 68 for forming a seal with an outer peripheral region of the spiral configuration 64. An axial center of the spiral configuration 64 may also be appropriately sealed to obstruct any gap and prevent fluid bypass.

The resulting apparatus 70 may be used for filtering particulate matter in a fluid stream, with the mantle 66 supporting the filtering media member 10 and the filtering media sheet 54 to permit flow of the fluid stream therethrough. In some examples, the apparatus 70 may be used to filter an engine exhaust gas stream. In some particular examples, the apparatus 70 may be used to filter small particles (e.g., less than 2 μm) from a gasoline engine exhaust gas stream.

In other examples, the filtering media member 10 and the filtering media sheet 54 may be assembled into a stacked configuration (not shown), with the filtering media sheet 54 sandwiched between adjacent layers of the filtering media member 10. The stacked configuration may be assembled and housed in a generally cuboidal exterior mantle (not shown). Other shapes and configurations may be possible.

Figure 7:
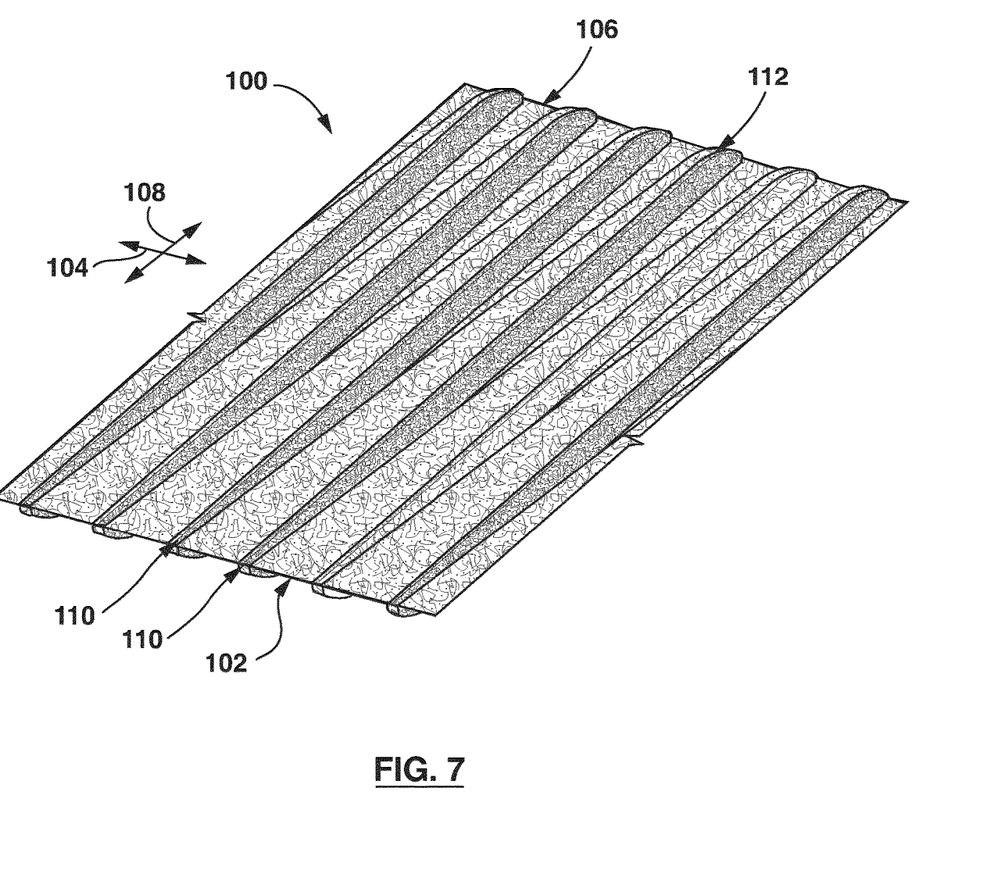
FIGS. 7 and 8 are perspective views of another filtering media member.
Figure 8:
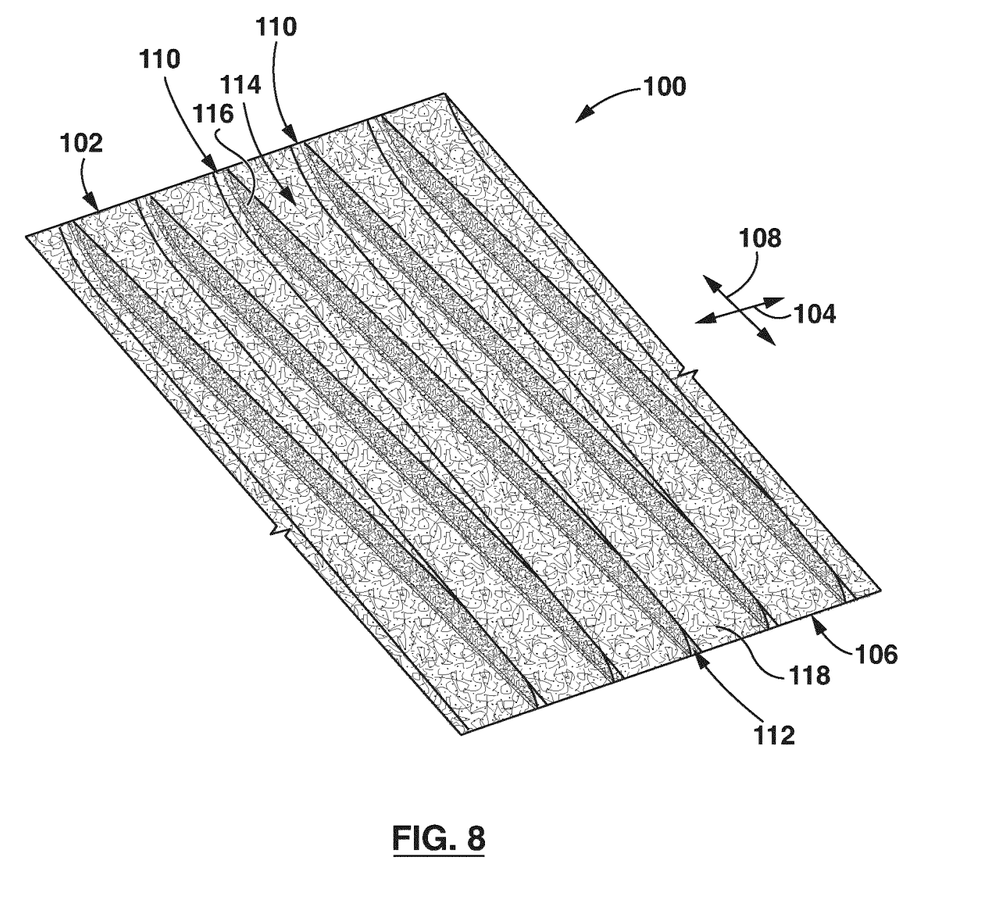

Referring to FIGS. 7 and 8, another example of a filtering media member is shown generally at reference numeral 100. The filtering media member 100 is formed of porous material. The filtering media member 100 includes an upstream edge 102 that extends in a lateral direction 104, and a downstream edge 106 that is spaced apart from the upstream edge 102 in a longitudinal direction 108 and extends in the lateral direction 104.

In the example illustrated, the filtering media member 100 includes a plurality of alternating first and second duct elements 110, 112 that are adjacent to one another in the lateral direction 104 and extend in the longitudinal direction 108 between the upstream and downstream edges 102, 106.

The duct elements 110, 112 may be formed to be roughly identical components, with their positions inverted in alternating fashion, which may simplify manufacturing and assembly.

Referring particularly to FIG. 8, when viewing this side of the filtering media member 100, each of the first duct elements 110 has a width in the lateral direction 104 that increases across its length between the upstream and downstream edges 102, 106. Correspondingly, each of the second duct elements 112 has a width in the lateral direction 104 that decreases across its length so that the second duct elements 112 taper between the upstream and downstream edges 102, 106.

In the example illustrated, at the upstream edge 102, each of the second duct elements 112 forms an inlet 114 between the respective adjacent sidewalls 116 of the first duct elements 110. At the downstream edge 106, each of the second duct elements 112 rises towards an outer surface 118 formed by the respective adjacent first duct elements 110.

In use, a particle-carrying fluid enters the upstream edge 102, passes through the duct elements 110, 112 (with a portion passing through the inlets 114), and exits the downstream edge 106, and particles are thereby entrained in the filtering media member 100.

The "tapered rising" arrangement of the duct elements 110, 112 may provide for the increase in effective surface area for particle entrainment by the filtering media member 100, and without gaps that would allow for bypass of fluid entirely through the filtering media member 100. The increase in surface area may delay clogging of the filtering media member 100.

In some examples, the filtering media member 100 may be formed of porous metal fiber material. In some examples, the filtering media member 10 may be formed of FeCrAl alloy fiber material. By way of example, and not intended to be limiting, the material may be Bekipor ST™ metal fiber filtration material (N.V. Bekaert S.A., Zwevegem, Belgium), having the product specifications provided above.

The first and second duct elements 110, 112 may be roll formed and/or stamp formed. The filtering media member 100 may be arranged into a spiral combination similar what is shown in FIG. 5, optionally with a filter media sheet (not shown), and assembled using a brazing powder and/or foil. The filtering media member 100 may be assembled into an apparatus similar to what is shown in FIG. 6.

While the above description provides examples of one or more apparatuses or methods, it will be appreciated that other apparatuses or methods may be within the scope of the accompanying claims.

We claim:

1. A filtering media member, comprising:
a first edge portion comprising an upstream edge that extends in a lateral direction;
a second edge portion spaced apart from the first edge portion in a longitudinal direction and comprising a downstream edge that extends in the lateral direction;
a main portion arranged intermediate the first and second edge portions, the edge portions and the main portion together defining a generally planar first surface; and
a plurality of channels formed in the main portion and recessed relative to the first surface to provide surface area for particle entrainment in the main portion, each of the channels arranged adjacent to one another in the lateral direction and having a length that extends in the longitudinal direction between the first and second edge portions, each of the channels comprising an inlet disposed proximate to the first edge portion so that, in use, fluid flows from the upstream edge through the inlet to the respective channel, and each of the channels has a width in the lateral direction that decreases across its length so that the channels taper between the first and second edge portions,
wherein the filtering media member is an integral component formed of a single piece of porous material, and
wherein each of the channels terminates adjacent to the second edge portion so that, in use, fluid flows from the channel through the second edge portion to the downstream edge.

2. The filtering media member of claim 1, wherein a ratio between the length of each of the channels in the longitudinal direction and a pitch of the channels in the lateral direction is greater than 5:1.

3. The filtering media member of claim 1, wherein each of the edge portions has a length dimension in the longitudinal direction that is substantially less than a length dimension of the main portion.

4. The filtering media member of claim 3, wherein a ratio between the length dimension of the edge portions and the length dimension of the main portion is 1:16.

5. The filtering media member of claim 1, wherein the edge portions and the main portion together define a generally planar second surface that is spaced apart from and generally parallel to the first surface, and each of the channels has a height dimension that is substantially less than a height dimension of the filtering media member between the first surface and the second surface.

6. The filtering media member of claim 5, wherein the height dimension of the channels is approximately 50% of the height dimension of the filtering media member.

7. The filtering media member of claim 1, wherein the filtering media member is formed of porous metal fiber material.

8. The filtering media member of claim 1, wherein the filtering media member is formed of an iron-chromium-aluminum (FeCrAl) alloy fiber material.

9. The filtering media member of claim 1, wherein the filtering media member at least partially comprises a brazing material, and the brazing material consists of a combination comprising a brazing paste mixed with a metal powder or fiber.

10. The filtering media member of claim 9, wherein the metal powder or fiber consists of an iron-chromium-aluminum (FeCrAl) alloy powder or fiber.

11. An apparatus for filtering particulate matter in a fluid stream, the apparatus comprising:
the filtering media member of claim 1; and
a housing supporting the filtering media member to permit flow of the fluid stream through the filtering media member between the upstream and downstream edges.

12. The apparatus of claim 11, comprising a filtering media sheet assembled adjacent to and parallel with the filtering media member.

13. The apparatus of claim 12, wherein the filtering media member and the filtering media sheet are arranged in a spiral configuration, with the filtering media sheet sandwiched between adjacent layers of the filtering media member.

14. The apparatus of claim 12, wherein the filtering media member and the filtering media sheet are arranged in a stacked configuration, with the filtering media sheet sandwiched between adjacent layers of the filtering media member.

15. The apparatus of claim 12, comprising a brazing material at least partially securing the filtering media member and the filtering media sheet together, and wherein the brazing material consists of a combination comprising a brazing paste mixed with a metal powder or fiber.

16. The apparatus of claim 15, wherein the metal powder or fiber consists of an iron-chromium-aluminum (FeCrAl) alloy powder or fiber.

17. A method of filtering particulate matter in a fluid stream, comprising:
 providing a filtering media member, formed as an integral component of a single piece of porous material, and comprising a first edge portion, a second edge portion spaced apart from the first edge portion in a longitudinal direction and comprising a downstream edge that extends in a lateral direction, a main portion arranged intermediate the first and second edge portions, the edge portions and the main portion together defining a generally planar first surface, and a plurality of channels formed in the main portion and recessed relative to the first surface to provide surface area for particle entrainment, each of the channels arranged adjacent to one another in the lateral direction and having a length that extends in the longitudinal direction, each of the channels comprising an inlet and having a width in the lateral direction that decreases across its length so that the channels taper in the longitudinal direction away from the inlet; and
 flowing the fluid stream through the inlet to the respective channel and through the filtering media member to entrain the particulate matter in the filtering media member,
 wherein each of the channels terminates adjacent to the second edge portion so that the step of flowing comprises flowing fluid from the channel through the second edge portion to the downstream edge.

18. A filtering media member, comprising:
 an upstream edge that extends in a lateral direction;
 a downstream edge that is spaced apart from the upstream edge in a longitudinal direction and extends in the lateral direction; and
 a plurality of alternating first and second duct elements extending in the longitudinal direction between the upstream and downstream edges,
 wherein each of the first duct elements has a width in the lateral direction that increases across its length between the upstream and downstream edges, and each of the second duct elements has a width in the lateral direction that decreases across its length so that the second duct elements taper between the upstream and downstream edges,
 wherein the filtering media member is an integral component formed of a single piece of porous material, and
 wherein, at the upstream edge, each of the second duct elements forms an inlet between the respective adjacent first duct elements, and, at the downstream edge, each of the second duct elements extends towards an outer surface formed by the respective adjacent first duct elements.

* * * * *